Jan. 30, 1951　　　L. E. PRINCE ET AL　　　2,539,592
PLANTER ATTACHMENT
Filed Oct. 1, 1946
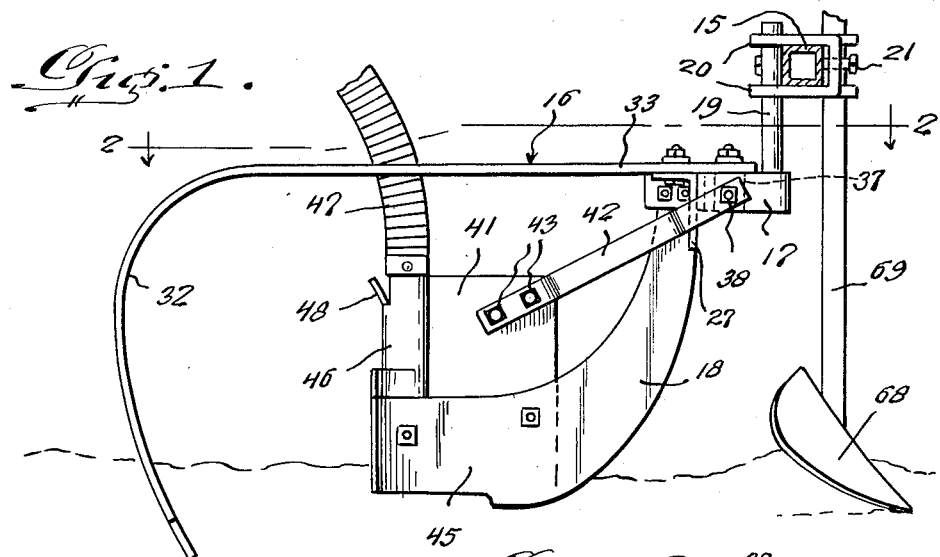
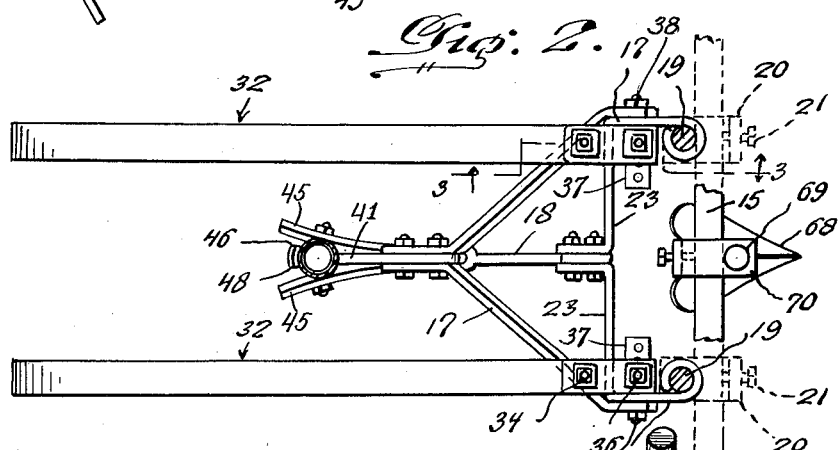
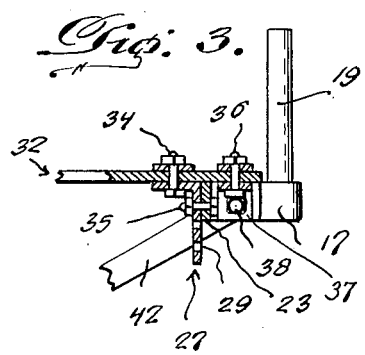
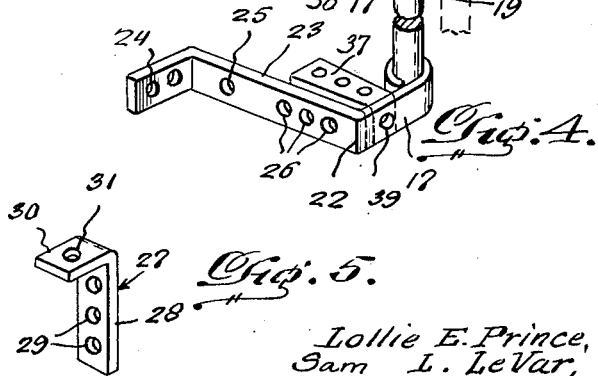
Lollie E. Prince,
Sam L. LeVar,
INVENTORS
BY
Attorneys Patented Jan. 30, 1951

2,539,592

UNITED STATES PATENT OFFICE 2,539,592

PLANTER ATTACHMENT

Lollie E. Prince and Sam L. Le Var, Cairo, Ga.

Application October 1, 1946, Serial No. 700,452

1 Claim. (Cl. 111—85)

This invention relates to planting arrangements, and more particularly to the planter foot unit therefor.

It is an object of the present invention to provide a planter foot unit which may be carried by the tractor bedding bar for lateral and vertical adjustment with respect thereto.

It is another object of the invention to provide a planter foot arrangement adapted for attachment to a bedding bar wherein the planting foot can be adjusted along the bar to vary the distance between the rows being planted and to provide in such planter foot unit spring teeth for effecting the covering of the seeds in the furrow which may be adjusted vertically or laterally relative to the foot, depending upon the operation for which the planter device is being used.

For other objects and for a better understanding of the invention, reference may be had to the following detailed description taken in connection with the accompanying drawings, in which:

Figure 1 is a side elevational view of the planter foot device embodying the features of the present invention.

Figure 2 is a plan view of the planter foot device shown in Figure 1.

Figure 3 is a fragmentary vertical sectional view taken substantially on the planes of the lines 3—3 of Figure 2.

Figure 4 is a perspective view of one of the supporting pieces showing a portion by means of which the piece is connected to the bedding bar.

Figure 5 is a detailed perspective view of one of the attaching pieces for the spring covering tooth.

Referring now particularly to Figures 1 to 5, 15 represents a bedding bar which is rigidly connected to the under portion of a tractor and extends transversely of the same. A planter foot device 16 embodying the features of the present invention is connected to the bedding bar 15 for vertical and lateral adjustment with respect thereto. This planter foot device includes a pair of supporting pieces 17 extending rearwardly for the attachment of a planter shoe 18 thereto and serving as means by which the planter device is attached to the bedding bar 15. Each of the supporting pieces has connected to its forward end a vertically extending stud 19 adapted to be retained by a clamp 20 to the bedding bar 15. The clamp 20 is of U-shape and has openings in its side leg portions adapted to receive the stud 19. A set screw 21 is disposed in its intermediate portion and serves to tighten the stud upon the bedding bar. It can be seen that with the set screw 21 being loosened that the supporting pieces and consequently the planter foot device can be adjusted laterally along the bedding bar, whereby to vary the distances between the rows being planted. When this adjustment has been thus effected, the set screws 21 are then tightened and the planter foot device will be rigidly retained upon the bedding bar 15.

The stud 19 on the supporting piece has considerable length so as to permit the adjustment of the supporting piece vertically through the U-shaped clamping bracket 20 and relative to the bedding bar 15 so as to provide a means whereby the planting foot can be adjusted vertically to effect different depths of planting.

Each supporting piece 17 is made of metal straps and is bent laterally inwardly as at 22, to provide a portion 23 extending laterally inwardly. The portions 23 terminate in rearwardly directed parallel portions to provide means for the attachment of the planter shoe 18 therebetween by fasteners extending through aligned holes 24. On the transverse portion 23 of the piece there may be attached a fertilizer hose by the insertion of a clamping bolt through a hole 25. Also, on the supporting portion 23 is a series of holes 26 through any one of which there may be attached a covering tooth bracket 27, Figure 5, of angle shape having a vertically extending portion 28 with a series of holes 29 therein and a horizontally extending portion 30 with but one hole 31 therein.

Adapted to trail the planter shoe 18 at opposite sides thereof are covering spring teeth 32 serving to cover the seeds which have been planted in a previously formed furrow. Each spring tooth 32 has a horizontal portion 33 with two holes 34 on its attached forward end. These holes 34 will be aligned in vertical registration with a hole 31 of the bracket 27 when the bracket is attached by bolt means 35 extending through one of the holes 29 thereof and one of holes 26 of the supporting portion 23. The forwardmost of the covering tooth holes 34 are connected by a bolt means 36 to a second bracket 37 of similar shape as the bracket 27. This bracket 37 has a portion with a plurality of holes the same as bracket 27, and is adapted to be connected to the supporting piece by an angularly bent portion and bolt means 38 extending through a hole 39 of the supporting piece, or be connected by its long portion to the opposite side of portion 23 at different heights. By the series of holes 26 of the supporting piece and by the holes 29 of the brackets 27 and 37, it will be apparent that the brackets 27 and 37 can be adjusted either vertically or transversely of the supporting portion 23, or be adjusted laterally to be located at different distances from the planting furrow whereby to vary the covering depth.

On the planter shoe 18 is a vertically extending plate 41 connected by brace members 42 to the supporting pieces 17 by the bolt means 38 used for attaching the bracket 37 to the supporting pieces 17. The rear end of the brace members 42 are connected by bolt means 43 with the plate 41. The rear end of the shoe 18 has laterally outwardly flared portions 45 between which is received a seed pipe 46 adapted to receive seed from a seed hose 47. The top of the seed pipe 46 is broken away, as indicated at 48, to provide a window through which the seed entering the seed pipe 46 may be viewed.

If it is desired to break up the soil ahead of the planter, there may be provided a furrow opening tool 68 secured to a standard 69, the standard being adjustably clamped to bar 15 by means of a bracket 70, similar to bracket 20, so that the tool may be adjusted vertically and laterally on bar 15 in accordance with the position of the planter to have the planter shoe 18 follow in the furrow provided by tool 68. Tool 68 may take any form, for example, a plow, a middle buster, a cultivator shovel.

Having now described our invention, we claim:

A planter attachment adapted to be secured to a transverse tool bar, comprising a pair of laterally spaced vertically disposed studs, a substantially U-shaped frame having forwardly extending legs, each of said studs respectively fixed at its lower end to a leg of said frame to dispose the frame in rearwardly extending relation from said studs, a planter shoe rigidly connected to said frame centrally thereof in rearwardly extending depending relation, a pair of earth engaging covering members, each member having a rearwardly directed horizontal portion terminating in a depending tooth portion, means rigidly connecting the forward ends of said horizontal portions to said frame on opposite sides of said planter shoe, and a clamp vertically adjustable on each stud for detachably securing said studs to said tool bar for vertical and lateral adjustment relative thereto, whereby the planter attachment is vertically and laterally adjustable on the tool bar.

LOLLIE E. PRINCE.
SAM L. LE VAR.

REFERENCES CITED

The following references are of record in the file of this patent:

UNITED STATES PATENTS

| Number | Name | Date |
| --- | --- | --- |
| 266,805 | Getz | Oct. 31, 1882 |
| 973,824 | Taylor | Oct. 25, 1910 |
| 1,044,930 | Shaver | Nov. 19, 1912 |
| 1,062,882 | Bruene | May 27, 1913 |
| 1,078,282 | Henefield | Nov. 11, 1913 |
| 1,966,966 | Lenz | July 17, 1934 |
| 2,319,737 | Johnson | May 18, 1943 |